United States Patent [19]

Jorissen et al.

[11] Patent Number: 5,086,097
[45] Date of Patent: Feb. 4, 1992

[54] ULTRAVIOLET STABILIZER FOR POLYCARBONATE COMPOSITIONS

[75] Inventors: Steven A. Jorissen, Mars; Sivaram Krishnan, Pittsburgh, both of Pa.

[73] Assignee: Mobay Corporation, Pittsburgh, Pa.

[21] Appl. No.: 638,462

[22] Filed: Jan. 7, 1991

[51] Int. Cl.$^5$ .............................................. C08K 5/27
[52] U.S. Cl. .................................... 524/91; 548/259
[58] Field of Search ................. 524/91, 281; 548/259; 558/266, 268, 270, 271, 274

[56] References Cited

U.S. PATENT DOCUMENTS

| | | | |
|---|---|---|---|
| 3,004,896 | 10/1961 | Heller et al. | 524/91 |
| 3,579,561 | 5/1971 | Meltsner | 558/270 |
| 4,104,217 | 8/1978 | Leistner et al. | 558/274 |
| 4,128,559 | 12/1978 | Pond et al. | 260/308 B |
| 4,230,857 | 10/1980 | Drake et al. | 558/268 |

*Primary Examiner*—Veronica P. Hoke
*Attorney, Agent, or Firm*—Joseph C. Gil; Aron Preis

[57] ABSTRACT

A thermoplastic molding composition comprising a polycarbonate resin and a benzotriazole ortho carbonate having an improved level of resistance to deterioration caused by exposure to ultraviolet radiation is disclosed. The ultraviolet stabilizer of the invention conforms to

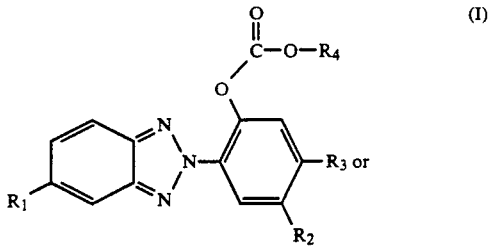

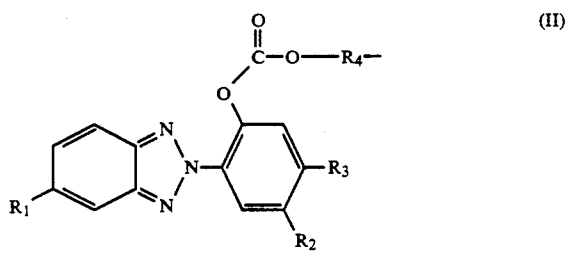

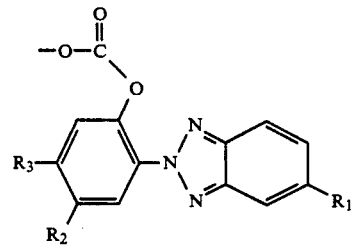

wherein
R$_1$ denotes a hydrogen or a halogen atom or a C$_{1-4}$ alkyl or alkoxy group,
R$_2$ and R$_3$ independently represent a hydrogen atom, a C$_{1-12}$ alkyl, a C$_{1-4}$ alkoxy group, a phenyl or a phenoxy radical, and
R$_4$ denotes a C$_{1-12}$ alkylene or a C$_{6-30}$ arylene group. The composition is suitable for the preparation of molded articles having an improved level of resistance to ultraviolet radiation.

13 Claims, No Drawings

ULTRAVIOLET STABILIZER FOR POLYCARBONATE COMPOSITIONS

FIELD OF THE INVENTION

The invention is directed to thermoplastic molding compositions which are rendered resistant to ultraviolet radiation and more particularly to compositions based on polycarbonate resins.

SUMMARY OF THE INVENTION

A thermoplastic molding composition comprising a polycarbonate resin and a benzotriazole ortho carbonate is noted for its resistance to deterioration caused by exposure to ultraviolet radiation. The ultraviolet stabilizer of the invention conforms to

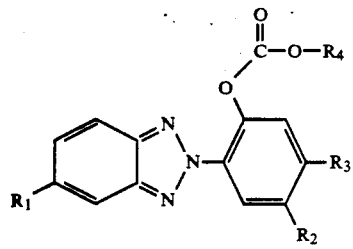

or

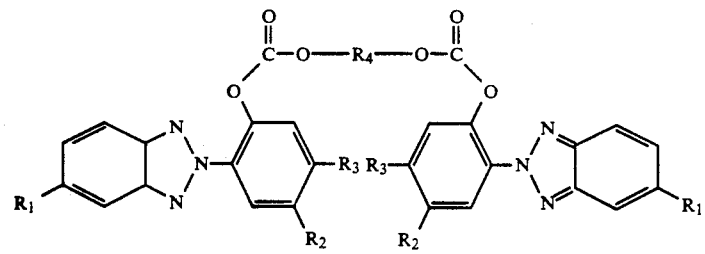

wherein
- $R_1$ denotes a hydrogen or a halogen atom or a $C_{1-4}$ alkyl or alkoxy group,
- $R_2$ and $R_3$ independently represent a hydrogen atom, a $C_{1-12}$ alkyl, a $C_{1-4}$ alkoxy group, a phenyl or a phenoxy radical, and
- $R_4$ denotes a $C_{1-12}$ alkylene radical or a $C_{6-30}$ arylene group. The composition is suitable for the preparation of molded articles having an improved level of resistance to ultraviolet radiation.

BACKGROUND OF THE INVENTION

Exposure to ultraviolet radiation, such as is included in sunlight, causes degradation in polymeric resins. The degradation may be expressed in terms of a deterioration of the mechanical and optical properties of the resin and renders such resins less suitable for some applications. The art recognize certain benzotriazoles as UV stabilizers for polymeric resins. Noted in this connection is U.S. Pat. No. 4,128,559.

DETAILED DESCRIPTION OF THE INVENTION

Aromatic polycarbonates within the scope of the present invention are homopolycarbonates and copolycarbonates and mixtures thereof.

The polycarbonates generally have a weight average molecular weight of 10,000-200,000, preferably 20,000-80,000 and their melt flow rate, per ASTM D-1238 at 300° C., is about 1 to about 65 gm/10 min., preferably about 2-15 gm/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the inventor conform to the structural formulae (1) or (2).

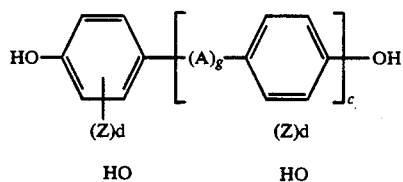
(I)

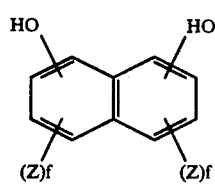

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

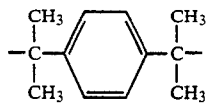

e and g both denote the number 0 to 1;

Z denotes F, Cl, Br or $C_1$-$C_4$-alkyl and if several Z radicals are substituents in one aryl radical, they may be identical or different from one another;

d denotes an integer of from 1 to 4; and f denotes an integer of from 0 to 3.

Among the dihydroxy compounds useful in the practice of the invention are hydroquinone, resorcinol, bis-(hydroxyphenyl)alkanes, bis-(hydroxyphenyl) ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxy-phenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methyl-butane, 1,1-bis -(4-hydroxyphenyl)-cyclohexane, α,α'-bis-(4-hydroxyphenyl)-p-diisopropylbenzene, 2,2-bis(3-methyl-4-hydroxyphenyl)-propane, 2,2-bis(3-chloro-4-hydroxyphenyl)-propane, bis-(3,5-dimethyl-4-hydroxyphenyl)-methane, 2,2,-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclo-hexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05-2.0 mol % (relative to the bisphenols) of polyhydroxyl compound. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri(4-hydroxyphenyl)-heptane; 1,3,5-tri-(4-hydroxphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol a based homopolycarbonate resins differing in terms of their respective molecular weights and characterized in that their melt flow indices (MFR) per ASTM D-1238 are about 16.5-24, 13-16, 7.5-13.0 and 3.5-6.5 gm/10 min., respectively. These are products of Mobay Corporation of Pittsburgh, Pa.

Other polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The ultraviolet stabilizer of the present invention conforms to

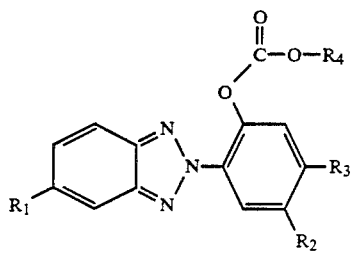

(I)

or

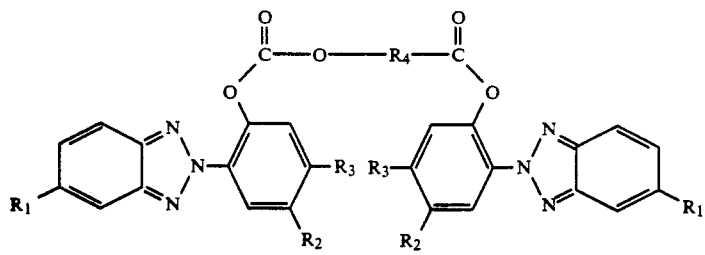

wherein
R₁ denotes a hydrogen or a halogen atom or a $C_{1-4}$ alkyl or alkoxy group,
R₂ and R₃ independently represent a hydrogen atom, a $C_{1-12}$ alkyl, a $C_{1-4}$ alkoxy group, a phenyl or a phenoxy radical, and
R₄ denotes a $C_{1-12}$ alkylene or a $C_{6-30}$ arylene group.
R₂ preferably represent a tertiary alkyl radical, most preferably tertiary octyl radical.

A preferred embodiment of the invention comprises a UV stabilizer conforming to

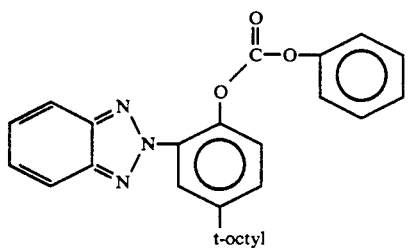

also preferred is the stabilizer conforming to

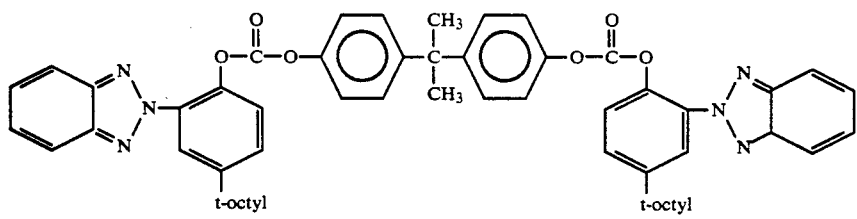

The benzotriazole of the invention may be prepared by methods known in the art. For instance, the synthesis may be carried out as follows.

A solution of 2-[2-hydroxy-5-p-octylphenyl]-benzotriazole (Tinuvin 329 from Ciba-Geigy), a stoichiometric amount of phenol chloroformate and an excess of triethyl amine in dry methylene chloride is refluxed at 40° C. for four hours. The precipitate is filtered and recrystallized in isopropanol, filtered and dried.

In the practice of the invention, a small amount which is effective to improve the stability of the polycarbonate resin under exposure to ultraviolet radiation is incorporated in the resin by conventional means and procedures which are well known in the art. Preferably, the amount of the UV stabilizer incorporated in the polycarbonate composition is about 0.1 to 2.0 percent, more preferably 0.25 to 1.0 percent relative to the weight of the composition.

The composition of the invention exhibits superior initial optical values including yellowness index of less than 3.30, haze value of less than 0.5% and total light transmission greater than 89.0% at 0.100 inch specimen thickness.

Experimental

A composition within the scope of the invention was prepared and its properties determined as is summarized below. Also prepared were other compositions containing other benzotriazoles including commercial UV stabilizers.

The UV stabilizers used in the examples below were as follows:

Example 1

Tinuvin 329, the structure of which conforms to

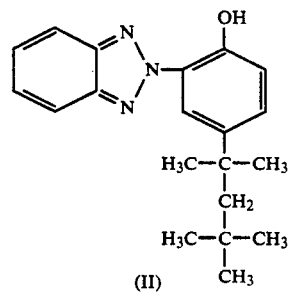

Example 2 control, containing no UV stabilizer.

Example 3

2-[(2-phenylester-5-t-octyl)phenyl]-2H-benzotriazole, conforming to

Example 4 bis[o-2H-benzotriazol-2-yl)-4-t-octylphenyl]-terephthalate, conforming to

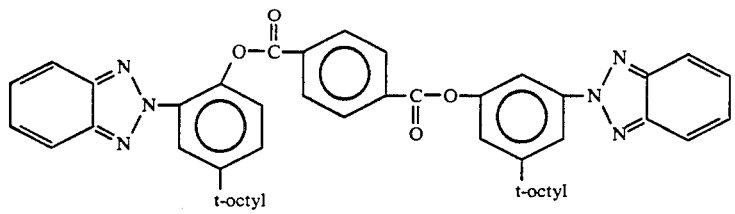

Example 5 bis[o-2H-benzotriazol-2-yl)-4-t-octylphenyl]-isophthalate, conforming to

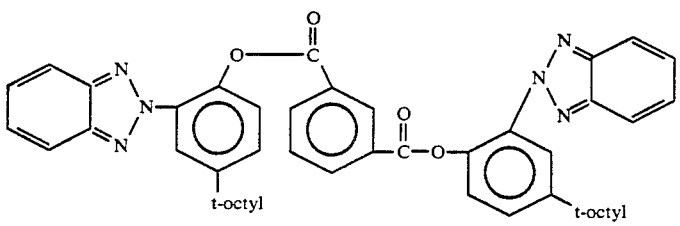

Example 6

2-[(2-phenylcarbonate-5-t-octyl)phenyl]-2H-benzotriazole, conforming to

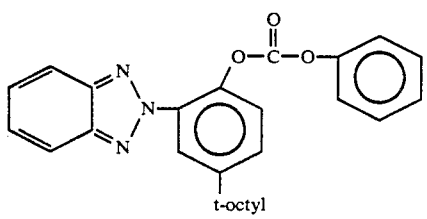

All the compositions contained small amounts of a mold release agent (0.20%) and a phosphite stabilizer (0.075%), neither of which is believed to be critical in the present context.

The tables below summarize the results of the evaluations of these compositions. The optical properties of the compositions were determined in accordance with ASTM D-1925. "h" denotes hours of exposure to a RS sunlamp.

TABLE 1

| | Yellowness Index | | | |
|---|---|---|---|---|
| Example | Initial | 120 h | 360 h | 720 h |
| 1 | 4.42 | 6.83 | 10.1 | 11.7 |
| 2 | 3.75 | 9.70 | 13.7 | 16.3 |
| 3 | 3.30 | 7.41* | 10.7 | 12.4 |
| 4 | 3.42 | 7.04 | 10.5 | 12.3 |
| 5 | 3.70 | 7.47 | 11.0 | 12.8 |
| 6 | 3.08 | 6.83 | 10.6 | 12.5 |

TABLE 2

| | Haze | | | |
|---|---|---|---|---|
| Example | Initial | 120 h | 360 h | 720 h |
| 1 | 1.24 | 1.71 | 2.50 | 2.88 |
| 2 | 0.95 | 1.14 | 1.68 | 2.33 |
| 3 | 0.68 | 0.76* | 0.64 | 1.61 |
| 4 | 0.61 | 0.95 | 1.18 | 1.30 |
| 5 | 0.62 | 0.64 | 1.27 | 1.26 |
| 6 | 0.44 | 0.76 | 1.34 | 1.46 |

TABLE 3

| | Total Light Transmission | | | |
|---|---|---|---|---|
| Example | Initial | 120 h | 360 h | 720 h |
| 1 | 86.9 | 86.9 | 87.0 | 85.5 |
| 2 | 87.8 | 87.3 | 87.3 | 85.8 |
| 3 | 89.1 | 88.8* | 87.8 | 88.2 |
| 4 | 88.9 | 88.5 | 88.7 | 87.4 |
| 5 | 88.7 | 88.7 | 88.6 | 87.1 |
| 6 | 89.1 | 88.7 | 88.7 | 87.1 |

*Tested after 142 hours exposure.

The initial optical properties of sample 6 which represents the present invention is superior to the corresponding performance of the composition which contains a prior art commercial stabilizer Tinuvin 329. It would further be noted that the initial yellowness index and the initial haze values of the composition of the invention are better than any of the exemplified compositions.

The invention has been described in detail with particular reference to the preferred embodiments yet it should be understood that variations and modifications may be made without departing from the scope of the invention.

What is claimed is:

1. A thermoplastic molding composition comprising (i) an aromatic polycarbonate resin and (ii) an effective amount of a UV stabilizer conforming to

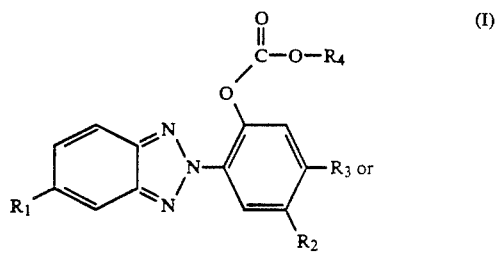

-continued (II)

[structure with R1-benzotriazole-phenyl-O-C(O)-O-R4, R2, R3]

[structure with R3, R2, benzotriazole-R1, -O-C(O)-O-]

wherein
R₁ denotes a hydrogen or a halogen atom or a $C_{1-4}$ alkyl or alkoxy group,
R₂ and R₃ independently represent a hydrogen atom, a $C_{1-12}$ alkyl, a $C_{1-4}$ alkoxy group, a phenyl or a phenoxy radical, and
R₄ denotes a $C_{1-12}$ alkylene radical or a $C_{6-30}$ arylene group.

2. The composition of claim 1 wherein said amount is about 0.1 to 2.0 percent relative to the weight of the composition.

3. The composition of claim 1 wherein said amount is about 0.25 to 1.0 percent relative to the weight of the composition.

4. The composition of claim 2 wherein said R₁ denotes a hydrogen.

5. The composition of claim 2 wherein said R₂ represents a hydrogen atom.

6. The composition of claim 1 wherein said R₂ represents a $C_{1-12}$ alkyl.

7. The composition of claim 1 wherein said R₂ represents a tertiary alkyl radical.

8. The composition of claim 1 wherein said R₂ represents a tertiary octyl radical.

9. A thermoplastic molding composition having initial optical properties which include a yellowness index of less than 3.30%, a haze value of less than 0.5% and total light transmission greater than 89.0% comprising (i) an aromatic polycarbonate resin and (ii) an effective amount of a UV stabilizer conforming to (I)

[structure with R1-benzotriazole-phenyl-O-C(O)-O-R4, R2, R3] or (II)

[structure with R1-benzotriazole-phenyl, -O-C(O)-O-R4, R2, R3]

[structure with R3, R2, benzotriazole-R1, -O-C(O)-O-]

wherein
R₁ denotes a hydrogen or a halogen atom or a $C_{1-4}$ alkyl or alkoxy group,
R₂ and R₃ independently represent a hydrogen atom, a $C_{1-12}$ alkyl, a $C_{1-4}$ alkoxy group, a phenyl or a phenoxy radical, and
R₄ denotes a $C_{1-12}$ alkylene or a $C_{6-30}$ arylene group.

10. The composition of claim 9 wherein said amount is about 0.25 to 1.0% relative to the weight of the composition, said R₁ is a hydrogen atom and said R₂ is a tertiary alkyl radical.

11. The composition of claim 10 wherein said stabilizer is 2-[(2-phenylcarbonate-5-t-octyl) phenyl]-2H-benzotriazole.

12. The composition of claim 9 wherein said stabilizer conforms to (II)

[structure: benzotriazole-phenyl(t-octyl)-O-C(O)-O-C₆H₄-C(CH₃)₂-C₆H₄-O-C(O)-O-phenyl(t-octyl)-benzotriazole]

13. The composition of claim 1 wherein said stabilizer conforms to

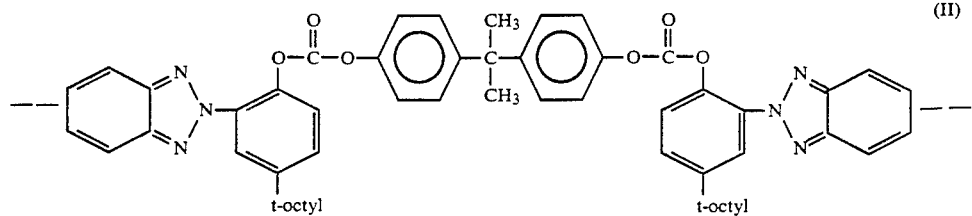
(II)